US008149786B2

(12) United States Patent
Shousterman et al.

(10) Patent No.: US 8,149,786 B2
(45) Date of Patent: Apr. 3, 2012

(54) TRANSFER OF COMMUNICATION SESSIONS BETWEEN BASE STATIONS IN WIRELESS NETWORKS

(75) Inventors: Leonid Shousterman, Herzlia (IL); Oleg Marinchenco, Modein (IL); Mark Altshuller, Ganot Hadar (IL); Vladimir Yanover, Kfar Saba (IL); Avner Aloush, Netanya (IL)

(73) Assignee: Alvarion Ltd., Tel Aviv (IL)

( * ) Notice: Subject to any disclaimer, the term of this patent is extended or adjusted under 35 U.S.C. 154(b) by 856 days.

(21) Appl. No.: 11/994,639

(22) PCT Filed: Jun. 21, 2006

(86) PCT No.: PCT/IL2006/000716
§ 371 (c)(1),
(2), (4) Date: Jun. 28, 2008

(87) PCT Pub. No.: WO2007/004208
PCT Pub. Date: Jan. 11, 2007

(65) Prior Publication Data
US 2009/0213810 A1 Aug. 27, 2009

(30) Foreign Application Priority Data

Jul. 3, 2005 (IL) .......................................... 169503

(51) Int. Cl.
*H04W 4/00* (2009.01)
(52) U.S. Cl. ........................................................ 370/331
(58) Field of Classification Search .................. 370/331, 370/436, 437, 438
See application file for complete search history.

(56) References Cited

U.S. PATENT DOCUMENTS

| 6,061,650 | A | 5/2000 | Malkin et al. | |
| 6,977,914 | B2 * | 12/2005 | Paila et al. | 370/331 |
| 7,139,833 | B2 * | 11/2006 | Heller | 709/238 |
| 7,260,399 | B1 * | 8/2007 | Oh et al. | 455/436 |
| 7,301,922 | B1 * | 11/2007 | Bhalla et al. | 370/331 |
| 7,672,288 | B1 * | 3/2010 | Iartym | 370/349 |
| 2002/0147837 | A1 | 10/2002 | Heller | |
| 2002/0191562 | A1 * | 12/2002 | Kumaki et al. | 370/331 |
| 2004/0185852 | A1 * | 9/2004 | Son et al. | 455/438 |
| 2005/0286469 | A1 * | 12/2005 | Yang et al. | 370/331 |
| 2006/0265474 | A1 * | 11/2006 | Kim et al. | 709/218 |

OTHER PUBLICATIONS

Perkins, C., "Mobile IP and Security Issue: An Overview," IEEE, 131-148, Oct. 25, 1999.

* cited by examiner

*Primary Examiner* — Chi Pham
*Assistant Examiner* — Farah Faroul
(74) *Attorney, Agent, or Firm* — Browdy and Neimark, PLLC

(57) ABSTRACT

A method and devices are provided to enable continuing a communication session currently carried by a mobile subscriber station (MSS) while switching from a first base station to a second base station. During the communication session that is being held with the MSS, a first Internet Protocol (IP) datagram is selected from among a plurality of IP datagrams associated with that communication session and received at a network gateway adapted to convey IP traffic received from the MSS. Following that selection and prior to establishing a connection between the mobile subscriber terminal and the second base station, IP datagrams that will be received at that network gateway after that first IP datagram had been received and which are addressed to the MSS, are backed up. Upon establishing a connection between the MSS and the second base station, the IP datagrams that were backed up are forwarded to the MSS, and all further IP datagrams which are addressed to the MSS and received at that network gateway after establishing the connection between the MSS and the second base station, will be forwarded to the MSS through the second base station.

13 Claims, 6 Drawing Sheets

| IP VER | IP HLEN | DSCP | IP DATAGRAM TOTAL LENGTH |
|---|---|---|---|
| IP IDENTIFICATION | | FLAGS | IP FRAGMENT OFFSET |
| IP TIME TO LIVE | IP PROTOCOL (GRE) | | IP HEADER CHECKSUM |
| SOURCE IP ADDRESS (E.G. BS) | | | |
| DESTINATION IP ADDRESS (E.G ASN GW EP) | | | |
| 0 | 1 | 0 RESERVED0 | VER | GRE PAYLOAD PROTOCOL TYPE (IP) |
| GRE KEY (IDENTIFIES IEEE 802.16E SERVICE FLOW) | | | |
| SDU SEQUENCE NUMBER | | | |
| START OF ENCAPSULATED PAYLOAD | | | |

*FIG. 4*

TRANSFER OF COMMUNICATION SESSIONS BETWEEN BASE STATIONS IN WIRELESS NETWORKS

FIELD OF THE INVENTION

The present invention relates to wireless communications and, in particular, to improved ways of provisioning services in mobile IP based wireless communications systems.

BACKGROUND OF THE INVENTION

Mobile IP is a protocol designed to allow mobile units, e.g. third generation cellular phones, laptop computers, etc. to roam between various sub-networks at various locations, while still maintaining Internet and/or WAN connectivity. In order to further discuss this type of operation, let us first explain some basic functional entities associated with mobile IP networks.

A number of solution has been proposed in the past to enable smooth hand over in cellular networks. Some of these solutions are described herein.

U.S. Pat. No. 6,741,577 discloses a method for inter-frequency handover in wireless CDMA systems which tries to decrease the likelihood of dropped calls by reducing bit error-rate while increasing the spreading factor.

U.S. RE 37,787 relates to a method in mobile radio systems in which the responsibility for transmitting message information to a mobile station is handed over from a first base station transmitter to a second base station transmitter, while the same radio channel is used before and after the handover, and the transmission is started from the second base station transmitter before terminated from the first base station transmitter, so that during a certain transmission time the same message information is transmitted to the mobile station from both the first and second base station transmitters.

U.S. Pat. No. 5,384,826 describes a cellular switching system in which the switching associated with a call originated within one cell but now serviced within another cell is distributed among base stations which are interconnected with each other through a local area network or a packet switch. The routing procedure associated with the point of origin for a given call is stored in the memory of a switch of public switched telephone network. As an active subscriber crosses a cell boundary, the switch routes all packets of information for the given call to the originating base station for the duration of the call. Each base station then forwards each packet to the subscriber's current base station via the local area network. In this manner, the architecture is unaffected by the increased crossing between cell boundaries since the switching associated with those calls not within the range of the initial base station is handled in a distributed manner by each base station via the local area network.

WO 05/006781 discloses a method and apparatus for facilitating base station selection/handover by a user terminal in a distributed wireless communication system. According to this disclosure, hysteresis is adaptively determined as a function of the variance of received signal strength fluctuations. In turn, an adaptive hysteresis factor is obtained and used for a subsequent handover decision, for example, based on a cost function that takes into account the hysteresis.

U.S. Pat. No. 6,728,540 describes handing over an ongoing communication with a mobile in a current cell of a wireless cellular system another cell, using information regarding a set of potential handover candidates. This information is transmitted from a base station in the current cell or from another fixed part transmitter in the system. The set of handover candidates for a given mobile in the current cell is determined based on stored adjacency information regarding the cells which are adjacent to the current cell. This adjacency information is stored after an initial system configuration, based on the actual physical layout of the cells, and may be altered during system operation to reflect the success or failure of particular attempted handovers. The set of potential handover candidates includes corresponding channel identifying information such as frequency and time slot and the potential handover candidate information is transmitted upon receipt of a handover assistance request from the mobile.

The disclosure of the references mentioned herein throughout the present specification are hereby incorporated by reference.

Still none of the solutions suggested in the past provides an adequate solution to the problem of hand over in a mobile packetized wireless network, and in particularly there are no solutions that enable preservation of data flow integrity during such hand over.

SUMMARY OF THE INVENTION

It is an object of the present invention to provide a method and apparatus to minimize data loss by when a mobile subscriber terminal is moved from an area serviced by one base station, to an area serviced by another base station.

It is another object of the present invention to provide a method and apparatus to allow introducing temporary sequential numbering of IP Datagrams during a communication session held with a mobile subscriber terminal.

It is still another object of the present invention to provide a method and apparatus to preserve downlink and/or uplink data flow integrity.

It is yet another object of the present invention to provide method and means for 802.16 MAC context synchronization between the target base station and the serving base station during a hand over process in which a communication held with a mobile subscriber terminal using the serving base station is continued through the target base station.

Other objects of the invention will become apparent as the description of the invention proceeds.

In accordance with a first embodiment of the invention, there is provided in a wireless system comprising a plurality of base stations, at least the network gateway, at least one traffic agent and a mobile subscriber terminal currently communicating with a first base station out of a plurality of the base stations. The base stations are adapted to bi-directionally communicate with a first network gateway (e.g. referred to sometimes as access network gateway), and that first network gateway is adapted to convey IP traffic received from the mobile subscriber terminal to the at least one traffic agent and to convey IP traffic received along a packetized network towards said mobile subscriber terminal. The method provided, allows continuing a communication session that is currently carried by the mobile subscriber terminal through the first base station, through using a second base station out of the plurality of base stations, and comprising:

during a communication session held with a mobile subscriber terminal, determining a first IP datagram out of a plurality of IP datagrams belonging to said communication session that are received at the first network gateway, and carrying out a back up procedure for IP datagrams received at said first network gateway after that first IP datagram and destined to the mobile subscriber terminal; and upon establishing a connection between the mobile subscriber terminal and the second base station, the first base station would cease to convey uplink traffic originated by the mobile subscriber terminal, the IP datagrams that were backed up during the back up step will be forwarded to the mobile subscriber terminal, and all IP datagrams destined to the mobile subscriber terminal and received at the first network gateway after establishing the connection between the mobile subscriber terminal and the second base station, will be forwarded to the mobile subscriber terminal through the second base station.

The traffic agent referred to above (which should be understood to encompass any type of node that allows communication with the mobile subscriber terminal, e.g. "peer node" or "corresponding node") may be either a home agent or a foreign agent, depending on the location at which the mobile subscriber terminal is located in respect of its own home mobile network. In case the traffic agent is a foreign agent, the wireless network shall preferably also comprise a home agent which will communicate through the foreign agent with the respective network gateway.

According to another embodiment of the invention, the method further comprises providing an indication to the second base station as to which was the first backed up IP datagram.

Preferably this indication will be in a form of sequential number that will be associated with the backed up IP datagrams by the first network gateway. Having such a local numbering of the backed up IP datagrams may simplify the process of regenerating the IP datagrams which should have been received by the mobile subscriber terminal during the hand over process, after its connection with the second base station has been established. Other indications could be for example notifying the sequence number of the packet that was used for conveying the IP datagram through the packetized network, notifying the time stamp of such a packet, etc.

As will be appreciated by those skilled in the art, numbering of datagrams has been suggested by IEEE 802.16 MAC, and according to the proposal described therein, each Base Station divides each SDU (datagram) into blocks of equal size (except the last one, which might be smaller), and when a BS transmits data to a mobile terminal, the latter acknowledges the reception of successfully delivered blocks. On the other hand, when a BS receives data from a mobile terminal it also acknowledges successfully received blocks. Still, the problem that has not been solved by the above solution is that each entity would assign the block numbers independently. By a preferred embodiment of the present invention, the block numbering is synchronized in different base stations by introducing additional numbering of the SDUs at the network gateway which is operative to anchor traffic for the mobile terminal.

According to another embodiment of the invention, the step of carrying out a back up procedure for IP datagrams received at said first network gateway and destined to the mobile subscriber terminal comprises replicating and multicasting the backed up IP datagrams to the first base station as well as towards one or more other base stations.

Still preferably, the indication of the first IP datagram (e.g. its sequence number) is comprised in a response sent to a registration request initiated by that other base station.

According to another preferred embodiment of the invention, the step of carrying out a back up procedure for IP datagrams received at said first network gateway and destined to the mobile subscriber terminal comprises storing the backed up IP datagrams, and forwarding them to the second base station after the connection between the mobile subscriber terminal and the second base station has been established. Preferably, the storage of the backed up IP datagrams will be carried at the first network gateway.

According to yet another embodiment of the invention, there is provided a method for carrying out an uninterrupted IP communication session with a mobile subscriber terminal through a traffic agent connected to an IP network, wherein the IP communication session is established in an area serviced by a first base station and continues while the mobile subscriber terminal moves to an area serviced by a second base station, the method comprising:

at a first network gateway associated with the first base station, selecting a first IP datagram out of a plurality of IP datagrams addressed to the mobile subscriber terminal, and carrying out a back up procedure for IP datagrams received at the first network gateway which proceeds that first IP datagram and destined to the mobile subscriber terminal; and upon establishing a connection between the mobile subscriber terminal and another base station out of the one or more other base stations, determining that another base station to be the second base station for servicing the mobile subscriber terminal;

upon determining that another base station to be the second base station:
　refraining from conveying uplink traffic comprising IP datagrams originated by the mobile subscriber terminal through the first base station; and
　forwarding the backed up IP datagrams destined to the mobile subscriber terminal through the second base station; and
　forwarding all downlink traffic comprising IP datagrams destined to the mobile subscriber terminal only through the second base station.

According to another preferred embodiment of the invention, the IP communication session currently held in an area serviced by the second base station may continue uninterruptedly while the mobile subscriber terminal moves to an area serviced by a third base station (where the third base station may be the first base station, if the mobile subscriber terminal returns to that area), the method comprising:

determining a first IP datagram out of a plurality of IP datagrams belonging to the communication session held through the second base station which are received at the first network gateway, and carrying out a back up procedure for IP datagrams received at said first network gateway after that first IP datagram and destined to the mobile subscriber terminal;

in response to establishing a connection between the mobile subscriber terminal and another base station out of the one or more other base stations, determining that other base station to be the third base station for servicing the mobile subscriber terminal;

upon determining the another base station to be the third base station:
　the second base station would cease to convey uplink traffic originated by the mobile subscriber terminal;
　the IP datagrams that were backed up during the back up step will be forwarded to the mobile subscriber terminal; and
　all IP datagrams destined to the mobile subscriber terminal and received at the first network gateway after establishing the connection between the mobile subscriber terminal and the third base station, will be forwarded to the mobile subscriber terminal through the third base station.

As will be appreciated by those skilled in the art, there could be cases where the first and second base stations will not communicate through the same network gateway, in which case the first network gateway may be used as an anchor network gateway, and will be operative to convey communications to and from the mobile subscriber terminal through a second network gateway.

According to yet another aspect of the invention, in a wireless system comprising a plurality of base stations, at least one network gateway, at least one traffic agent and a mobile subscriber terminal currently communicating with a first base station out of said plurality of base stations communicating with a first network gateway and wherein said first network gateway is adapted to convey IP traffic received from said mobile subscriber terminal to the at least one traffic agent and to convey IP traffic received along a packetized network towards the mobile subscriber terminal, a method to enable hand over of a communication session that is currently carried by that mobile subscriber terminal through the first base station, by allowing the continuation of the communication session while using a second base station selected out of the plurality of base stations, and comprising:

transmitting 802.16 MAC synchronization information from the first base station to the second base station, to enable synchronizing the operation of both said base stations; and after confirming that the operation of both base stations has been synchronized, the first base station would cease to convey uplink traffic originated by the mobile subscriber terminal and traffic destined to the mobile subscriber terminal shall be forwarded to the mobile subscriber terminal through the second base station.

As will be appreciated by those skilled in the art, the network gateway in this embodiment is preferably operating merely as a pipe through which communications are exchanged between the first base station and the second base station.

Preferably, this method further comprising the steps of:

determining a first IP datagram out of a plurality of IP datagrams belonging to the communication session that are received at the first network gateway, and carrying out a back up procedure for IP datagrams received at the at least one network gateway after that first IP datagram and destined to the mobile subscriber terminal; and upon establishing a connection between the mobile subscriber terminal and the second base station, the first base station would cease to convey uplink traffic originated by the mobile subscriber terminal, the IP datagrams that were backed up during the back up step will be forwarded to the mobile subscriber terminal, and all IP datagrams destined to the mobile subscriber terminal and received at the first network gateway after establishing the connection between the mobile subscriber terminal and the second base station, will be forwarded to the mobile subscriber terminal through the second base station.

By still another aspect of the invention there is provided a network gateway adapted to operate in a mobile IP wireless network and comprising:

an interface operative to allow communication between the network gateway and a first plurality of base stations associated therewith;

an interface operative to allow communication between the network gateway and a traffic agent connected to a packetized network;

at least one processor adapted to:

determine a first IP datagram out of a plurality of received IP datagrams associated with a communication session held with a mobile subscriber terminal through a first base station out of said first plurality of base stations;

carry a back up procedure for the IP datagrams which follow that first IP datagram and destined to the mobile subscriber terminal; and in response to receiving a notification that a connection has been established between the mobile subscriber terminal and a base station other than said first base station, enable forwarding of the backed up IP datagrams to the mobile subscriber terminal through the other base station;

enable forwarding of downlink traffic comprising IP datagrams destined to the mobile subscriber terminal only through the other base station; and preventing from conveying uplink traffic comprising IP datagrams originated by the mobile subscriber terminal, through the first base station.

According to still another preferred embodiment of the invention, the network gateway further comprising a storage means adapted to store the backed up IP datagrams, and to allow their retrieval upon the receipt of the notification that the connection has been established between the mobile subscriber terminal and the other base station.

In accordance with yet another preferred embodiment of the invention, the network gateway further comprising means adapted to replicate IP datagrams that are addressed to a mobile subscriber terminal currently communicating through a first base station, and prepare them for multicasting towards a plurality of base stations.

By yet another embodiment of the present invention, there is provided an anchor network gateway which sends data to/receives data from all the BSs involved in hand over process for a Mobile Subscriber Station ("MSS"). This gateway assigns sequence numbers to Service Data Units ("SDUs"), the datagrams. Once the MSS leaves the respective serving BS, the latter would deliver to the Target BS the information which allows synchronizing the SDU Numbers assigned by the anchor network gateway and the BSN numbers assigned in the MAC of each base station. In addition, the Target BS is being informed which BSNs have already transmitted/received datagrams and which BSNs have already acknowledged their receipt, a process which enables continuous numbering of the BSNs in the Target BS.

According to another preferred embodiment of the present invention, there is provided a base station adapted to operate in a mobile IP wireless network and comprising:

an interface operative to allow communication between at least one other base station and a at least one mobile subscriber terminal;

at least one processor adapted to:

forward 802.16 MAC synchronization information to the at least one other base station required for synchronizing the operation of both base stations;

receive confirmation that the operation of both base stations has been synchronized;

cease to convey uplink traffic originated by the at least one mobile subscriber terminal.

BRIEF DESCRIPTION OF THE DRAWINGS

FIG. 4—illustrates a GRE Tunneling frame in accordance with yet another embodiment of the present invention.

DETAILED DESCRIPTION OF THE INVENTION

A better understanding of the present invention is obtained when the following non-limiting detailed description is considered in conjunction with the following drawings.

Figure 1:
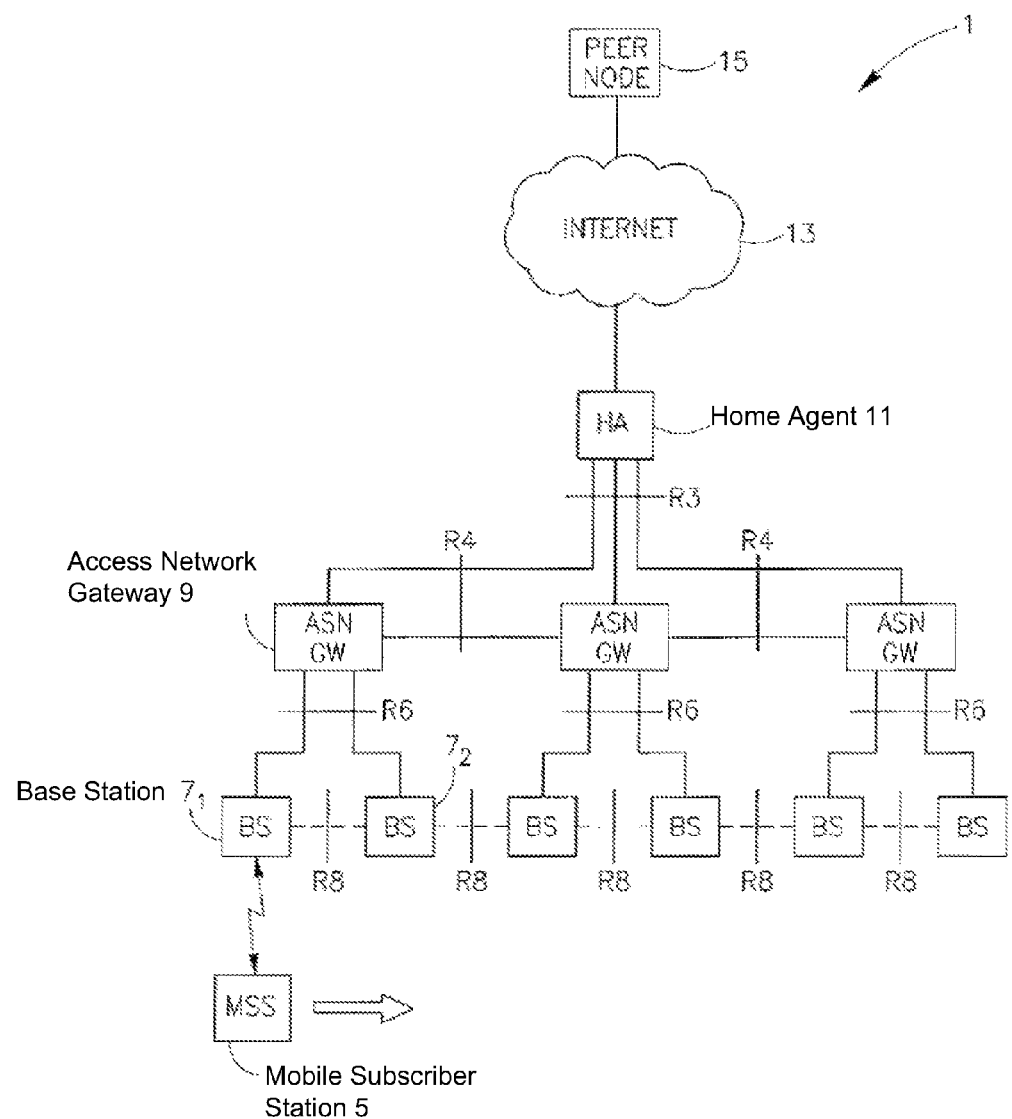
FIG. 1—presents a schematic illustration of a wireless mobile network architecture.

FIG. 1 presents a schematic functional illustration of the architecture of a typical mobile network 1 constructed in accordance with the WiMAX recommendation. Mobile network 1 comprises a plurality of mobile subscriber stations (MSS) 5 (only 1 is presented) that communicates with base station (BS) $7_1$ and is about to move to an area covered by BS $7_2$. The various BSs communication with each other by using one more control plane protocols that would allow internetworking between the base stations while ensuring fast and seamless handover between the BSs, referred to in FIG. 1 as R8. The BSs are operative to communicate with access services network gateways (ASN GWs), 9, which in turn communicate through home agent (HA) 11 and via the Internet to allow carrying out communications between MSS 5 with peer node 15, which resides behind a non-mobile part of the Internet, while moving between different BSs.

Preferably, the communication between a number of BSs $7_{i's}$ and the corresponding ASN GW 9 is carried by applying one or more control and bearer plane protocols for internetworking between the BS and ASN GW (designated as R6). Communications between the various ASN GWs themselves is carried by control plane and bearer plane protocols that coordinate inter-ASN GW mobility (designated as R4). One of the options for implementing R4 may be a modification of Mobile IP with GRE encapsulation in which the GRE Key identifies an IEEE 802.16 Service Flow that belongs to the relevant MSS. The communication held between the various ASN GWs and the applicable HA may preferably be carried by applying control plane and bearer plane protocols for internetworking between the ASN GW and HA, preferably Mobile IP (Version 4), designated as R3.

Now, let us turn to FIG. 2A to 2E which illustrate an example of carrying out an embodiment according to the present invention. The data path that is demonstrated in this example is designed to follow the MSS movement to ensure that communication between the MSS and the Peer Node (i.e. the session the MSS is involved with) is not interrupted.

Figure 2A:
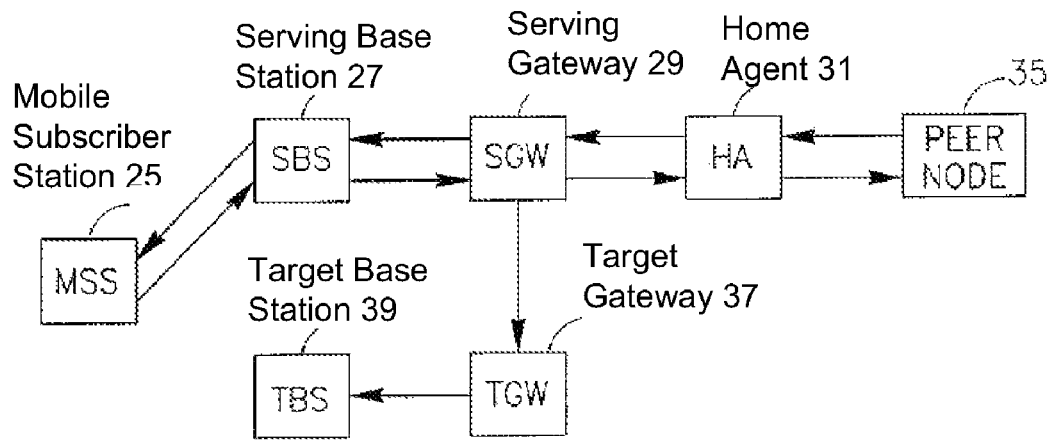
FIGS. 2A to 2E—present a schematic illustration various steps of a method conduct in accordance with an embodiment of the present invention.

As demonstrated in FIG. 2A, MSS 25 communicates with peer node 35 through serving base station SBS (27), serving access services network gateway, SGW 29, HA 31 and via the Internet (not shown in this FIG.), in a way as described above. At a certain point of time, the MSS is about to leave the area covered by SBS 27, and a hand over process should be initiated. The hand over process may be initiated as a result of any one of a number reasons, for example, a mobile terminal may request hand over because of degradation in the quality of service received, the network may initiate HO for the same reason, etc.

Upon starting the hand over (HO) process, the Serving ASN GW multicasts the downlink traffic to the entire set of the candidate Target BSs ("TBS") 39 via the appropriate target access gateway ("TGW") 37 in addition to forwarding it to the Serving BS. This set of candidates may be determined for example after receiving from the mobile terminal indications as to which are the other base stations that are "sensed" by the mobile terminal. For the sake of simplicity only one TGW and one TBS are illustrated in this FIG. The Target BSs store the downlink traffic, preferably until the MSS would move to an area where it will be served by another SBS. The uplink traffic is still communicated via Serving BS 27 and SGW 29.

Figure 2B:
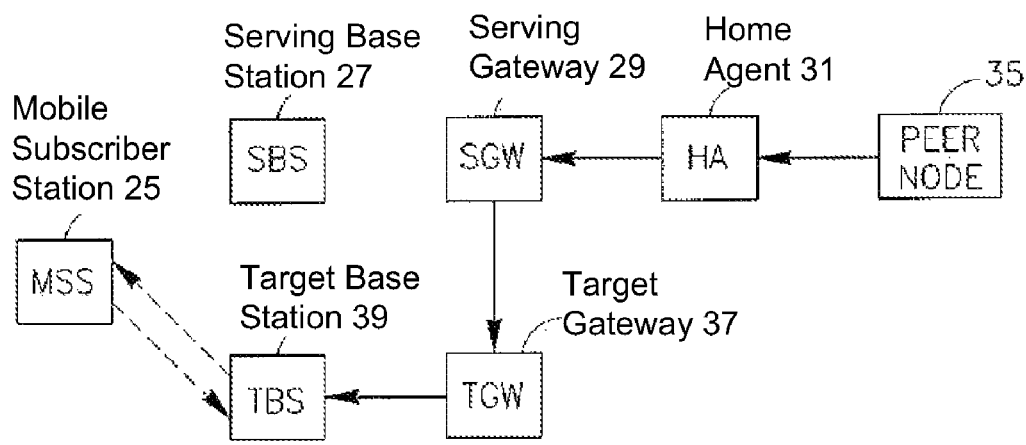
Figure 2C:
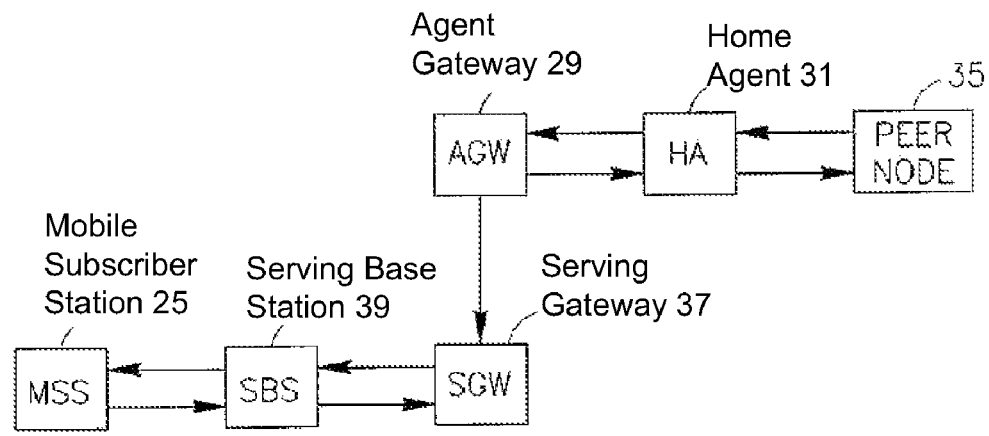

At a certain moment, MSS 25 leaves the coverage provided by Serving BS 27 and as depicted in FIG. 2B, an IEEE 802.16 network re-entry protocol begins with one of the candidate Target BSs 39. At about that moment (could be after successful competition of the re-entry protocol or at any appropriate moment before the full completion occurs, the uplink traffic flow is not conveyed anymore by the former SBS while the downlink target flow is forwarded only to the Target BS. When MSS 25 completes network re-entry with the chosen target BS 39, this BS becomes the MSS 25 serving BS and the ASN GW 37 with which this BS is associated, becomes the Serving ASN GW. The previous Serving ASN GW now becomes the Anchor ASN GW. The uplink traffic flow resumes and is conveyed through the Serving BS, Serving ASN GW and Anchor ASN GW. The Downlink traffic is conveyed in the opposite direction (and the Anchor ASN GW ceases multicasting the downlink traffic to the rest of the previous Candidate Target BSs). This situation is depicted in FIG. 2C. Then, traffic stays anchored to the Anchor ASN GW until a "convenient moment" at which the traffic anchor is relocated to the current Serving ASN GW and the traffic is conveyed again as shown in this FIG. 2C. The point in time referred to above as a "convenient moment" would preferably be upon release of intensive and/or QoS sensitive data communication sessions (e.g. VoIP), or at any other proper that will be determined by the user of the method of the invention.

Figure 2D:
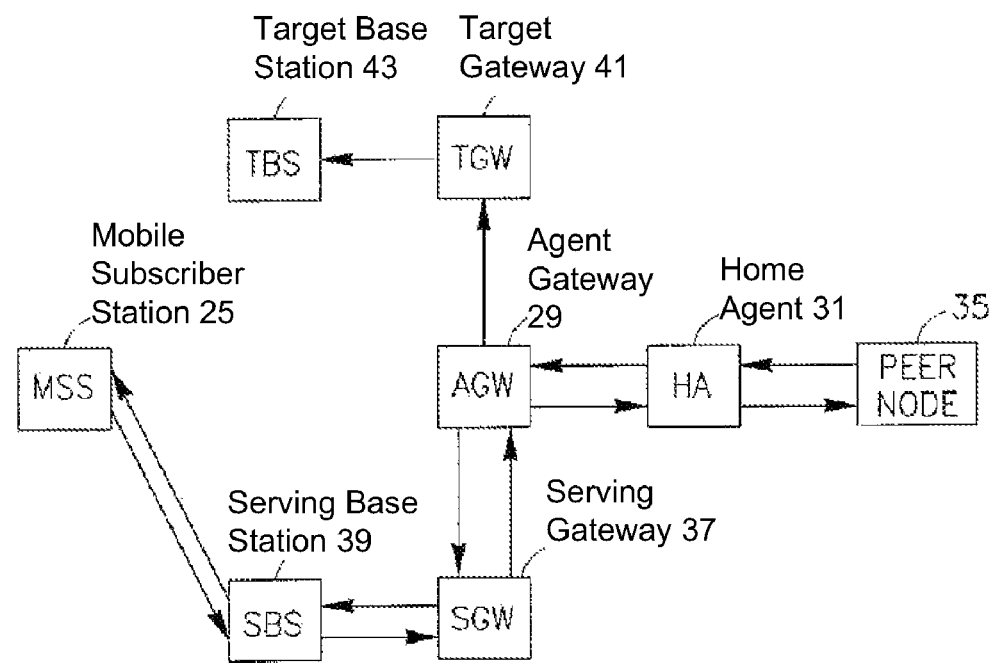

Let us assume now that another HO process is initiated while the traffic associated with MSS 25 is still anchored to that certain ASN GW 29. The process described above is repeated mutates mutandis with the difference that now the traffic is multicast from the Anchor ASN GW 29 as shown in FIG. 2D. Again, for the purpose of simplicity, only one Target BS is shown in this FIG.

Figure 2E:
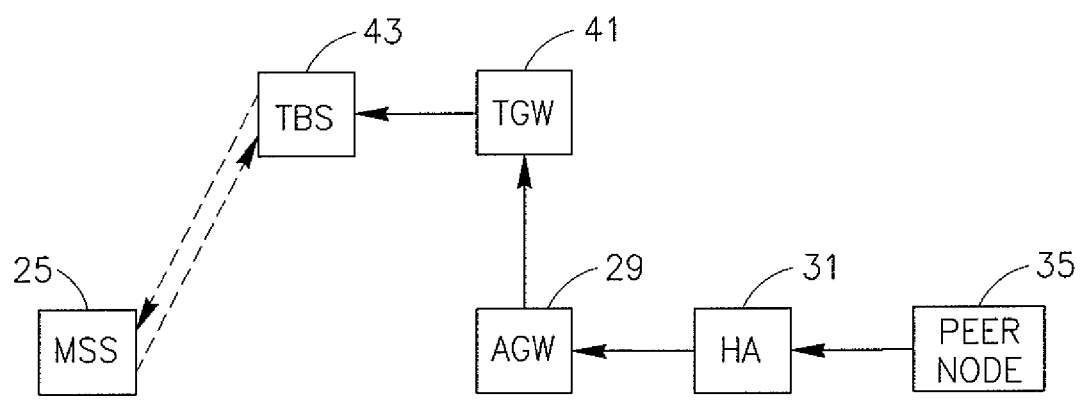
Figure 3:
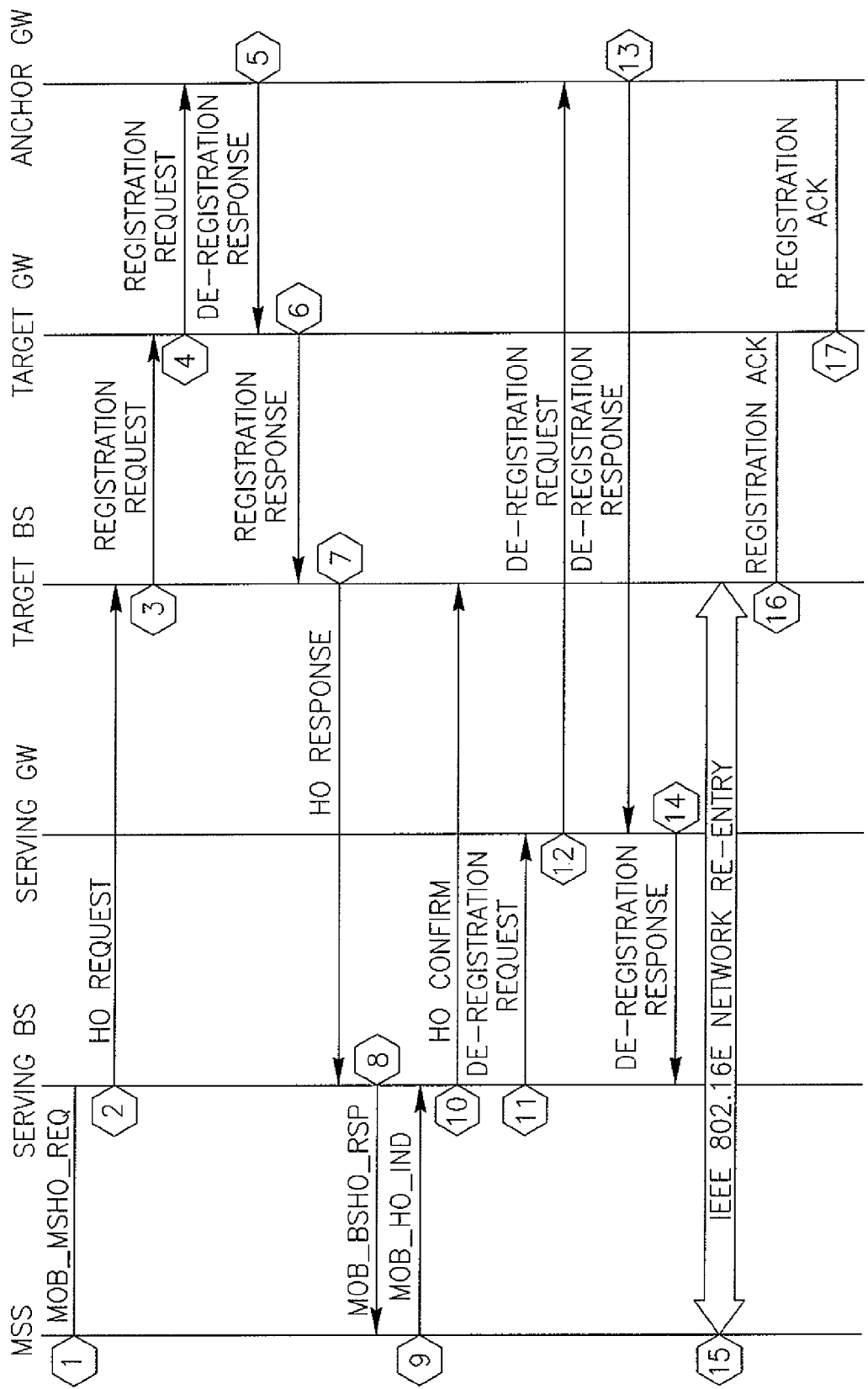
FIG. 3—demonstrates an example of an HO procedure carried out in accordance with an embodiment of the present invention.

During the network re-entry process, the steps described are repeated and the traffic flow looks as it is demonstrated in FIG. 2E.

A somewhat more detailed example of the HO process is described herein.

The MSS initiates HO by sending MOB_MSHO_REQ to the Serving BS. The message that is proposed for use at this stage, its content and its usage are defined in IEEE 802.16e.

Upon receiving MOB_MSHO_REQ, the Serving BS sends HO Requests to the entire set of the Target BSs involved in the HO. The message to be used may be any type of applicable message known in the art per se.

Upon receiving the HO Request, the Target BS instigates GRE tunnel establishment with the Target ASN GW. This is achieved with sending Registration Request to the Target ASN GW.

After receiving the Registration Request, the Target ASN sends Registration Request to the Anchor ASN GW.

The Anchor ASN GW responds by sending a Registration Response. At this moment, the Anchor ASN GW starts replicating and forwarding the downlink data destined to the MSS also to the Target BS (via the Target ASN GW), which has instigated registration. The SDU Sequence Number of the first IP datagram forwarded to the Target BS (via the Target ASN GW) is included in the content of the Registration Response. An example of such a tunneling message is shown in FIG. 4.

The Target ASN GW receives Registration Response and sends Registration Response to the Target BS. According to the present invention, the SDU Sequence Number sent by the Anchor GW should be forwarded to the Target BS. Preferably, almost simultaneously, the Target ASN GW may start receiving the downlink flow destined to the MSS under HO. The Target ASN GW forwards the data to the Target BS immediately after sending Registration Response.

Upon receiving Registration Response, the Target BS sends HO Response to the Serving BS. The SDU Sequence Number sent by the Anchor ASN GW should be forwarded to the Serving BS in the HO Response. This way the Serving BS learns which part of the downlink data flow is available in each Target BS. By an embodiment of the present invention, the Target BS stores the data destined to the MSS until the latter arrives. The traffic flows as it is shown in FIG. 2D.

After receiving HO Responses from the entire set of the Target BSs involved in the HO, the Serving BS tries to deliver to the MSS the SDUs that have Sequence Numbers lower than those available in the Target BSs. After delivering these SDUs, the Serving BS enables the HO process by sending a MOB_BSHO_RSP message. For the latter message, one may use that the message defined in IEEE 802.16. Delivering data to the MSS may continue after sending MOB_BSHO_RSP.

Prior to leaving the Serving BS, the MSS sends MOB_HO_IND to the Serving BS, which is in fact the last message that the Serving BS would receive from the MSS.

Upon receiving MOB_HO_IND, the Serving BS sends HO Confirm to the Target BS. Preferably, the Serving BS includes in the message MAC Data Synchronization IE that may be used to inform the Target BS what Blocks of what MAC PDUs have been delivered to the MSS.

Upon receiving MOB_HO_IND, the Serving BS instigates De-Registration by sending De-Registration Request to the Anchor ASN GW. Upon receiving the De-Registration Request, the Anchor ASN GW would preferably cease to send downlink data for the MSS under HO to the Serving BS (through the Serving GW). The Anchor ASN GW would then respond by sending a De-Registration Response. The Target Serving GW forwards the De-Registration Response to the Serving BS, and the MSS completes the network re-entry with the Target BS. The Target BS becomes now the new Serving BS. Preferably, immediately after that step is taken, the MSS and BS should complete Uplink and Downlink Data Synchronization Procedures over the Air Interface.

The Target BS sends Registration Acknowledgement message to the Target ASN GW, and u Upon receiving the Registration Acknowledgement message, the Target ASN GW sends Registration Acknowledge to the Anchor ASN GW. At this moment the Target ASN GW becomes the Serving ASN GW. It should be noted that initially the Anchor GW might be collocated with Serving GW (e.g. the case shown in FIG. 2A), nevertheless, the procedures described above should still be valid.

According to a preferred embodiment of the invention, a Fast Base Station Switching (hereinafter "FBSS") procedure is carried essentially according to the method described above, with the following changes: when the MSS requests adding a BS to the Active Set, the multicasting from the Anchor GW is carried in accordance with the above description until the step where the Serving BS enables the HO process after having delivered the Service Data Units ("SDUs") that have Sequence Numbers lower than those available in the Target BS, to the MSS. Then, the MSS requests Anchor BS to switch, and the MAC Data Synchronization IEs are delivered to the new Anchor BS in a manner described above. Finally, the new Anchor BS completes the Uplink and Downlink Data Synchronization Procedures over the Air Interface.

By yet another aspect of the present invention, there is provided the use of SDU Sequence Numbers, e.g. when the ASN GW marks the IP Datagrams sent in accordance with protocols R6 and R4 discussed above, with their respective Sequence Numbers. One example of how this idea can be implemented, is, by using standard GRE Sequence Numbering option, in which case the SDUs are numbered separately per GRE Key (i.e. per IEEE 802.16 Service Flow).

In addition, the following elements may be used while implementing the various embodiments of the present invention:

First Multicast SDU Sequence Number IE:
The IE may contain the following information:
1. GRE Key Value, identifying the IEEE 802.16 Service Flow that belongs to the MSS under HO.
2. The Sequence Number of the first SDU associated with the specified Service Flow and that has been forwarded to the Target BS.

MAC Data Synchronization IE:
The IE may contain the following information:
1. Service Flow ID that belongs to the MSS under HO.
2. Connection ID ("CID") associated with the Service Flow.
3. The Sequence Number of the first SDU that has not been fully acknowledged.
4. Block Sequence Number ("BSN"), which corresponds to the start of this SDU.
5. Map of acknowledged blocks with BSN higher than the BSN pointing to the start of the first, not fully acknowledged, SDU.

It is to be understood that the above description only includes some embodiments of the invention and serves for its illustration. Numerous other ways of managing various points in the hand over process in mobile wireless telecommunication networks may be devised by a person skilled in the art without departing from the scope of the invention, and are thus encompassed by the present invention.

Also, although the present invention was described in particularly as related to WiMAX networks, networks in which the air interface is based on IEEE 802.16, still the method and devices described herein may be applicable to other cellular networks (mutates mutandis) and the present invention should be understood to encompass them as well.

The invention claimed is:

1. In a wireless system comprising a plurality of base stations, at least one network gateway, at least one traffic agent and a mobile subscriber terminal currently communicating with a first base stations out of said plurality of base stations communicating with a first network gateway and wherein said first network gateway conveys Internet Protocol (IP) traffic received from said mobile subscriber terminal to the at least one traffic agent and to convey IP traffic received along a packetized network towards said mobile subscriber terminal, a method to enable continuing a communication session that is currently carried by said mobile subscriber terminal through said first base station, through using a second base station out of said plurality of base stations, and comprising:

during a communication session held with the mobile subscriber terminal, selecting an IP datagram out of a plurality of IP datagrams being part of said communication session and received at said first network gateway, to be a first IP datagram;

prior to establishing a connection between said mobile subscriber terminal and said second base station, backing up a plurality of IP datagrams that were received at said first network gateway after that first IP datagram had been received thereat, and wherein said plurality of IP datagrams are addressed to the mobile subscriber terminal; and upon establishing a connection between said mobile subscriber terminal and said second base station, forwarding the IP datagrams that were backed up during the backup step to the mobile subscriber terminal, and forwarding all further IP datagrams addressed to said mobile subscriber terminal and received at the first network gateway after establishing the connection between the mobile subscriber terminal and the second base station, to the mobile subscriber terminal through said second base station.

2. The method according to claim 1, further comprising stopping the step of backing up the IP datagrams received at said first network gateway, following the establishment of the connection between said mobile subscriber terminal and said second base station.

3. The method according to claim 1, further comprising a step of providing an indication to said second base station as to which was the first backed up IP datagram.

4. The method according to claim 3, wherein said indication is in a form of sequential number associated with said first backed up IP datagrams.

5. The method according to claim 4, wherein said indication is comprised in a response sent to a registration request initiated by said second base station to said first network gateway.

6. The method according to claim 1, wherein said step of carrying out a back up procedure for IP datagrams received at said first network gateway and destined to the mobile subscriber terminal comprises replicating and multicasting the backed up IP datagrams towards one or more base stations other than said first base station.

7. The method according to claim 1 wherein said step of carrying out a back up procedure for IP datagrams received at said first network gateway and destined to the mobile subscriber terminal comprises storing the backed up IP datagrams, and forwarding them to said second base station after establishing a connection between said mobile subscriber terminal and said second base station.

8. A method for carrying out an uninterrupted Internet Protocol (IP) communication session with a mobile subscriber terminal through a traffic agent connected to a first IP network, wherein said IP communication session is established in an area serviced by a first base station and continues while said mobile subscriber terminal moves to an area serviced by a second base station, the method comprising:
at a first network gateway associated with said first base station, selecting a first IP datagram out of a plurality of IP datagrams being part of said communication session with said mobile subscriber terminal;
prior to establishing a connection between said mobile subscriber terminal and said second base station, carrying out a back up procedure for IP datagrams received at said first network gateway after said first IP datagram had been received thereat and destined to said mobile subscriber terminal; and
upon establishing a connection between said mobile subscriber terminal and another base station out of one or more other base stations, determining said other base station to be a second base station for servicing said mobile subscriber terminal;
upon determining said second base station:
refraining from conveying uplink traffic comprising IP datagrams originated by said mobile subscriber terminal, through the first base station;
forwarding the backed up IP datagrams destined to said mobile subscriber terminal through said second base station; and
forwarding all downlink traffic comprising IP datagrams destined to the mobile subscriber terminal only through said second base station.

9. The method according to claim 8, further comprising the following steps to enable uninterrupted IP communication session currently held in an area serviced by said second base station while said mobile subscriber terminal moves to an area serviced by a third base station:
selecting an IP datagram out of a plurality of IP datagrams belonging to the communication session held through the second base station, wherein the IP datagrams belonging to this plurality of IP datagrams are received at the first network gateway to be another first IP datagrams, and prior to establishing a connection between said mobile subscriber terminal and a third base station, carrying out a back up procedure for IP datagrams received at said first network gateway after that other first IP datagram and destined to said mobile subscriber terminal;
in response to establishing a connection between said mobile subscriber terminal and another base station, determining that other base station to be a third base station for servicing the mobile subscriber terminal;
upon determining said third base station:
the second base station would cease to convey uplink traffic originated by said mobile subscriber terminal;
IP datagrams that were backed up during the back up step will be forwarded to said mobile subscriber terminal; and
all IP datagrams destined to said mobile subscriber terminal and received at said first network gateway after establishing the connection between said mobile subscriber terminal and said third base station, will be forwarded to said mobile subscriber terminal through said third base station.

10. In a wireless system comprising a plurality of base stations, at least one network gateway, at least one traffic agent and a mobile subscriber terminal currently communicating with a first base station out of said plurality of base stations communicating with a first network gateway and wherein said first network gateway conveys Internet Protocol (IP) traffic received from said mobile subscriber terminal to the at least one traffic agent and to convey IP traffic received along a packetized network towards said mobile subscriber terminal, a method to enable handover of a communication session that is currently carried by said mobile subscriber terminal through said first base station, by allowing the continuation of said communication session while using a second base station selected out of said plurality of base stations, and comprising:
transmitting synchronization information from said first base station to said second base station, to enable synchronizing the operation of both said base stations;
determining a first IP datagram out of a plurality of IP datagrams belonging to said communication session and received at said first network gateway;
prior to establishing a connection between said mobile subscriber terminal and said second base station, backing up IP datagrams received at said first network gateway after the receipt of said first IP datagram which are destined to the mobile subscriber terminal; and
upon establishing a connection between said mobile subscriber terminal and said second base station, the IP datagrams that were backed up during the back up step and further IP datagrams received at the first network gateway after establishing the connection between the mobile subscriber terminal and the second base station and destined to said mobile subscriber terminal, shall be forwarded to said mobile subscriber terminal through said second base station.

11. A network gateway operates in a mobile IP wireless network comprising:

an interface configured to allow communication between said network gateway and a first plurality of base stations associated therewith;

an interface configured to allow communication between the network gateway and a traffic agent connected to a packetized network;

at least one processor configured to:

determine a first IP datagram out of a plurality of received IP datagrams being part of a communication session held with a mobile subscriber terminal through a first base station out of said first plurality of base stations;

carry a back up procedure for the IP datagrams which follow said first IP datagram and destined to said mobile subscriber terminal before a connection between said mobile subscriber terminal and said second base station has been established; and in response to receiving a notification that a connection has been established between said mobile subscriber terminal and a base station other than said first base station, enable forwarding of said backed up IP datagrams to said mobile subscriber terminal through said other base station;

enable forwarding of downlink traffic comprising IP datagrams destined to said mobile subscriber terminal only through said other base station; and preventing from conveying uplink traffic comprising IP datagrams originated by said mobile subscriber terminal, through said first base station.

12. The network gateway according to claim 11, further comprising means configured to replicate IP datagrams that are addressed to said mobile subscriber terminal currently communicating through said first base station, and prepare them for multicasting towards a plurality of base stations.

13. The network gateway according to claim 11, further comprising a storage means configured to store said backed up IP datagrams, and to allow their retrieval upon receipt of a notification that a connection has been established between said mobile subscriber terminal and said other base station.

* * * * *